US012803022B2

(12) United States Patent
Hill et al.

(10) Patent No.: US 12,803,022 B2
(45) Date of Patent: Nov. 17, 2026

(54) MULTIPLE FUEL CELL STACKS IN A SINGLE ENDPLATE ARRANGEMENT

(71) Applicant: HYDROGENICS CORPORATION, Mississauga (CA)

(72) Inventors: Andrew Hill, Scarborough (CA); Paolo Forte, Maple (CA)

(73) Assignee: HYDROGENICS CORPORATION, Mississauga (CA)

( * ) Notice: Subject to any disclaimer, the term of this patent is extended or adjusted under 35 U.S.C. 154(b) by 829 days.

(21) Appl. No.: 18/319,011

(22) Filed: May 17, 2023

(65) Prior Publication Data

US 2023/0387435 A1 Nov. 30, 2023

Related U.S. Application Data

(60) Provisional application No. 63/345,955, filed on May 26, 2022.

(51) Int. Cl.

*H01M 8/04746* (2016.01)
*H01M 8/0247* (2016.01)
*H01M 8/2484* (2016.01)
*H01M 8/249* (2016.01)

(52) U.S. Cl.

CPC ..... *H01M 8/04753* (2013.01); *H01M 8/0247* (2013.01); *H01M 8/2484* (2016.02); *H01M 8/249* (2013.01)

(58) Field of Classification Search

None

See application file for complete search history.

(56) References Cited

U.S. PATENT DOCUMENTS

| | | | | |
|---|---|---|---|---|
| 5,945,232 | A | 8/1999 | Ernst et al. | |
| 10,998,571 | B2 | 5/2021 | Blanchet | |
| 2006/0204815 | A1 | 9/2006 | Lam | |
| 2022/0190378 | A1* | 6/2022 | Harvey | H01M 8/249 |
| 2022/0285702 | A1* | 9/2022 | Haga | H01M 8/2475 |
| 2023/0402638 | A1* | 12/2023 | Voigt | H01M 8/249 |

FOREIGN PATENT DOCUMENTS

| | | |
|---|---|---|
| JP | 2006040752 | 2/2011 |
| KR | 100814527 | 3/2008 |
| KR | 100846920 | 7/2008 |

OTHER PUBLICATIONS

DE102020206794 (Year: 2020).*

* cited by examiner

*Primary Examiner* — Brian R Ohara

(74) *Attorney, Agent, or Firm* — Barnes & Thornburg LLP

(57) ABSTRACT

A system includes a plurality of fuel cell stacks, a balance of plant (BOP), and a first endplate and a second endplate. Each of the plurality of fuel cell stacks includes at least one fuel cell. The BOP is configured to monitor and control operation of the plurality of the fuel cell stacks. The BOP is operatively coupled to at least one of the first endplate and the second endplate to deliver, transfer, and vent fuel and oxidant to and from the plurality of fuel cell stacks.

20 Claims, 10 Drawing Sheets

MULTIPLE FUEL CELL STACKS IN A SINGLE ENDPLATE ARRANGEMENT

CROSS-REFERENCE TO RELATED APPLICATIONS

This non-provisional application claims the benefit and priority, under 35 U.S.C. § 119(e) and any other applicable laws or statutes, to U.S. Provisional Patent Application Ser. No. 63/345,955 filed May 26, 2022, the entire disclosure of which is hereby expressly incorporated herein by reference.

TECHNICAL FIELD

The present disclosure generally relates to operating a fuel cell stack.

BACKGROUND

Fuel cell systems are known for their efficient use of fuel to develop direct current (DC) electric power. A fuel cell produces electricity by electrochemically combining a fuel and an oxidant across an ionic conducting layer, an electrolyte, for which many fuel cells are named. Individual fuel cells may be interconnected in series or in parallel and assembled to form a fuel cell stack configured to produce electrical power to support a specific application.

The present disclosure is directed to a system that enables combining two or more fuel cell stacks within a single endplate and balance of plant (BOP) arrangement. Accordingly, the system allows for increasing a power density of a fuel cell module by increasing only the necessary components for producing power while utilizing a single set of balance of plant components within a common single endplate. In this manner, the power density of the fuel cell module is increased without having to add additional balance of plants or increase the size of an existing balance of plant.

SUMMARY

Embodiments of the present invention are included to meet these and other needs.

In one aspect, described herein, a system comprises a plurality of fuel cell stacks, a balance of plant (BOP), a first endplate, and a second endplate. Each of the plurality of fuel cell stacks includes at least one fuel cell. The balance of plant (BOP) is configured to monitor and control operation of the plurality of the fuel cell stacks. The BOP is operatively coupled to at least one of the first endplate and the second endplate to deliver, transfer, and vent fuel and oxidant to and from the plurality of fuel cell stacks. A first fuel cell stack of the plurality of fuel cell stacks and a second fuel cell stack of the plurality of fuel cell stacks are both located between the first endplate and the second endplate.

In some embodiments, the at least one fuel cell of the first fuel cell stack of the plurality of fuel cell stacks may include a mirrored cathode current collector plate including a first end and a second end opposite the first end and the at least one fuel cell of the second fuel cell stack of the plurality of fuel cell stacks may include a mirrored anode current collector plate including a first end and a second end opposite the first end, and wherein the mirrored cathode current collector plate and the mirrored anode current collector plate may be located side by side such that the second end of the mirrored cathode current collector plate may be placed next to the first end of the mirrored anode current collector plate.

In some embodiments, the mirrored cathode current collector plate of the first fuel cell stack of the plurality of fuel cell stacks may be a mirror image of the mirrored anode current collector plate of the second fuel cell stack of the plurality of fuel cell stacks relative to a longitudinal axis.

In some embodiments, each of the mirrored cathode current collector plate and the mirrored anode current collector plate may define a plurality of ports, and wherein a first plurality of ports of the mirrored cathode current collector plate may be a mirror image of a second plurality of ports of the mirrored anode current collector plate relative to the longitudinal axis. In some embodiments, the first plurality of ports of the mirrored cathode current collector plate may include a first port located on a top half of the mirrored cathode current collector plate and a second port located on a bottom half of the mirrored cathode current collector plate, wherein the first port and the second port may be symmetric with one another relative to a lateral axis that is perpendicular to the longitudinal axis.

In some embodiments, at least one of the first endplate and the second endplate may be a cathode endplate, and wherein the other of the at least one of the first endplate and the second endplate may be an anode endplate. In some embodiments, the BOP may be coupled to at least one of the first endplate and the second endplate using one of ducts or hoses.

In some embodiments, the plurality of fuel cell stacks may include at least the first fuel cell stack, the second fuel cell stack, a third fuel cell stack, and a fourth fuel cell stack. In some embodiments, the first fuel cell stack of the plurality of fuel cell stacks may be electrically coupled to the second fuel cell stack of the plurality of fuel cell stacks via a bus bar.

According to a second aspect, described herein, a system includes a housing and a balance of plant (BOP). The housing encloses a plurality of fuel cell stacks, wherein each fuel cell stack of the plurality of fuel cell stacks includes at least one fuel cell. The balance of plant (BOP) is configured to monitor and control operation of the plurality of the fuel cell stacks. The BOP is operatively coupled to deliver, transfer, and vent fuel and oxidant to and from the plurality of fuel cell stacks.

In some embodiments, the system may further comprise a first endplate on a top side of the plurality of fuel cell stacks and a second endplate on a bottom side opposite the top side of the plurality of fuel cell stacks, wherein the BOP may be coupled to the plurality of fuel cells stacks via at least one of the first endplate and the second endplate.

In some embodiments, the at least one fuel cell of a first fuel cell stack of the plurality of fuel cell stacks may include a mirrored cathode current collector plate and the at least one fuel cell of a second fuel cell stack of the plurality of fuel cell stacks may include a mirrored anode current collector plate, the mirrored cathode current collector plate of the first fuel cell stack and the mirrored anode current collector plate of the second fuel cell stack may be located side by side.

In some embodiments, the mirrored cathode current collector plate of the first fuel cell stack may be a mirror image of the mirrored anode current collector plate of the second fuel cell stack relative to a longitudinal axis. In some embodiments, each of the mirrored cathode current collector plate and the mirrored anode current collector plate may define a plurality of ports, and wherein a first plurality of ports of the mirrored cathode current collector plate may be a mirror image of a second plurality of ports of the mirrored anode current collector plate relative to the longitudinal axis.

In some embodiments, the mirrored cathode current collector plate of the first fuel stack may include a positive electrical terminal and the mirrored anode current collector plate of the second fuel cell stack may include a negative electrical terminal, and wherein the positive electrical terminal may be disposed on a first wall of the housing and the negative electrical terminal may be disposed on a second wall of the housing, the second wall may be opposite the first wall.

In some embodiments, the housing and the BOP may comprise a first fuel cell module, and wherein positioning the first fuel cell module adjacent to a second fuel cell module including a corresponding housing and BOP may allow direct coupling of the negative electrical terminal of the first fuel cell module with a positive electrical terminal of the second fuel cell module without additional conductors to form a compact assembly of multiple fuel cell modules.

According to a third aspect of the present disclosure, described herein, a system comprises a first fuel cell and a second fuel cell. The first fuel cell includes a first fuel cell plate defining a first plurality of ports configured to deliver, transfer, and vent fuel and oxidant to and from the first fuel cell. The second fuel cell includes a second fuel cell plate defining a second plurality of ports configured to deliver, transfer, and vent fuel and oxidant to and from the second fuel cell. The first plurality of ports of the first fuel cell plate is a mirror image of the second plurality of ports of the second fuel cell plate relative to a longitudinal axis. The first fuel cell plate of the first fuel cell and the second fuel cell plate of the second fuel cell are located adjacent to one another such that positioning the first fuel cell in a first fuel cell stack and positioning the second fuel cell in a second fuel cell stack allows one balance of plant (BOP) to monitor and control operation of both the first fuel cell stack and the second fuel cell stack.

In some embodiments, the first fuel cell plate may be a cathode current collector plate and the second fuel cell plate may be an anode current collector plate. In some embodiments, the cathode current collector plate of the first fuel cell may include a positive electrical terminal and the anode current collector plate of the second fuel cell may include a negative electrical terminal.

In some embodiments, the system may further comprise a housing enclosing the first fuel cell stack and the second fuel cell stack such that the positive electrical terminal of the first fuel cell may be disposed about a first wall of the housing and the negative electrical terminal of the second fuel cell may be disposed about a second wall of the housing, the first wall being disposed opposite the second wall.

BRIEF DESCRIPTION OF THE DRAWINGS

The detailed description particularly refers to the following figures, in which.

DETAILED DESCRIPTION

Figure 1A:
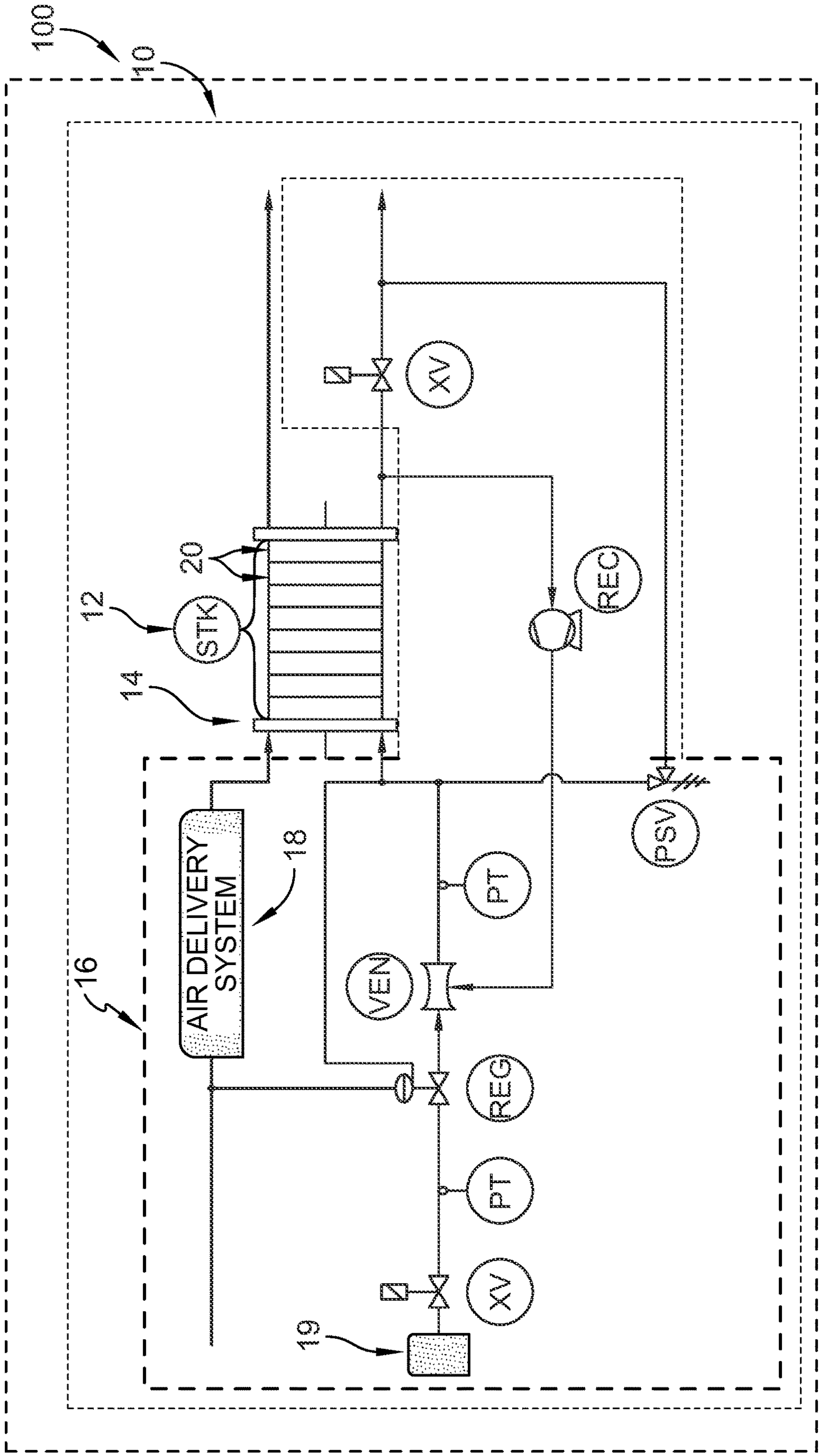
FIG. 1A is a schematic view of an exemplary fuel cell system including an air delivery system, a hydrogen delivery system, and a fuel cell module including a stack of multiple fuel cells.
Figure 1C:
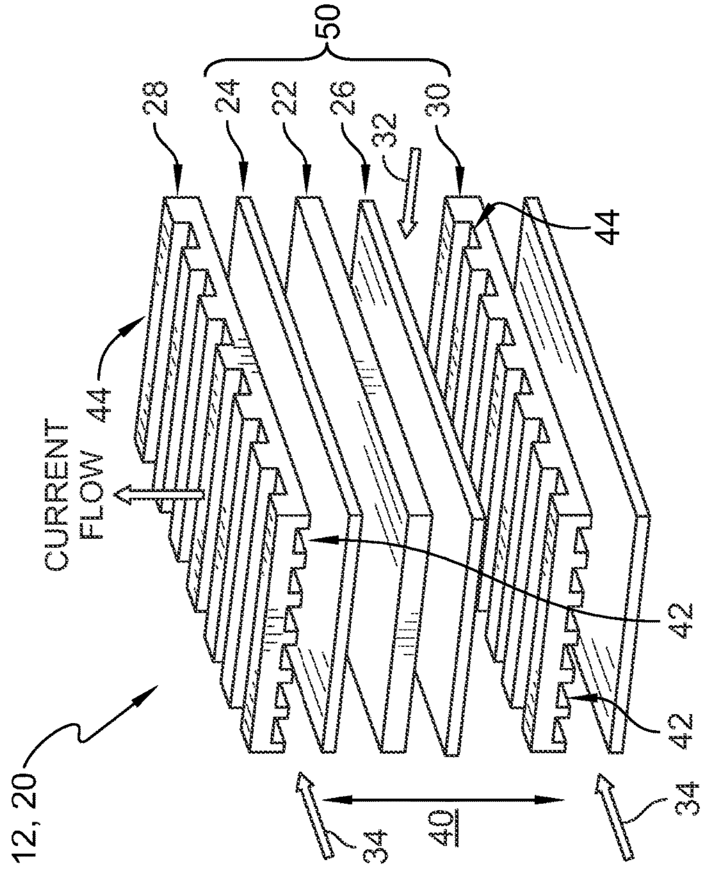
FIG. 1C is a perspective view of an exemplary repeating unit of a fuel cell stack of the fuel cell system of FIG. 1A.
Figure 1B:
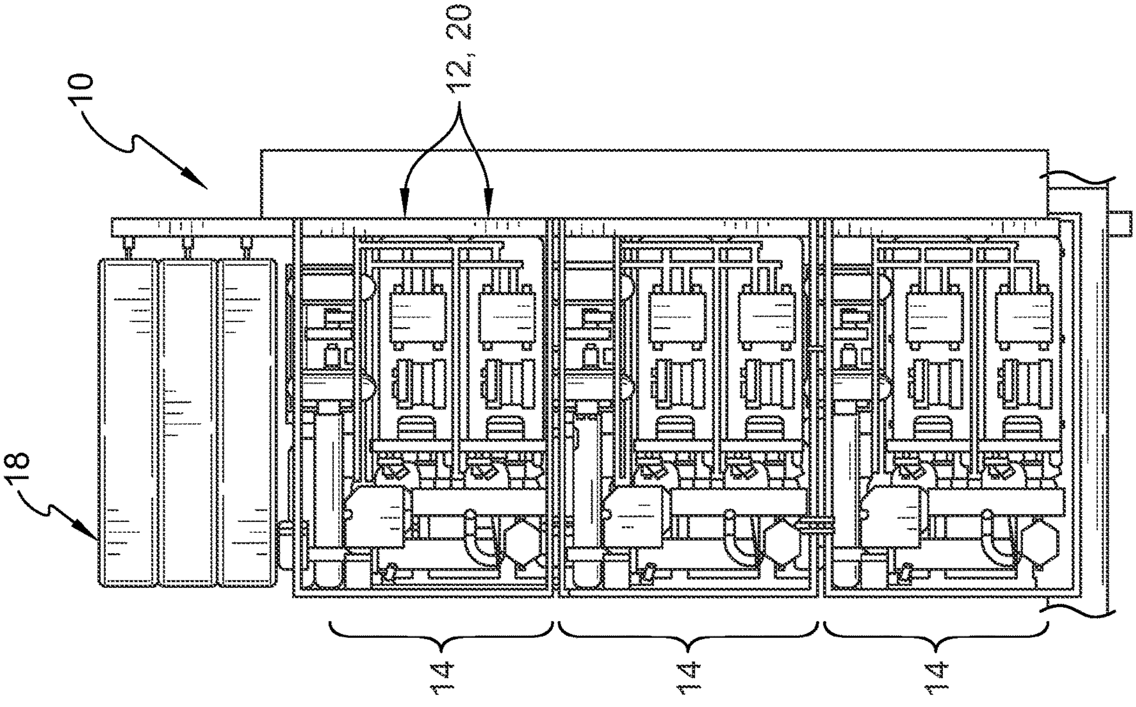
FIG. 1B is a cutaway view of an exemplary fuel cell system including an air delivery system, hydrogen delivery systems, and a plurality of fuel cell modules each including multiple fuel cell stacks.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals, and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
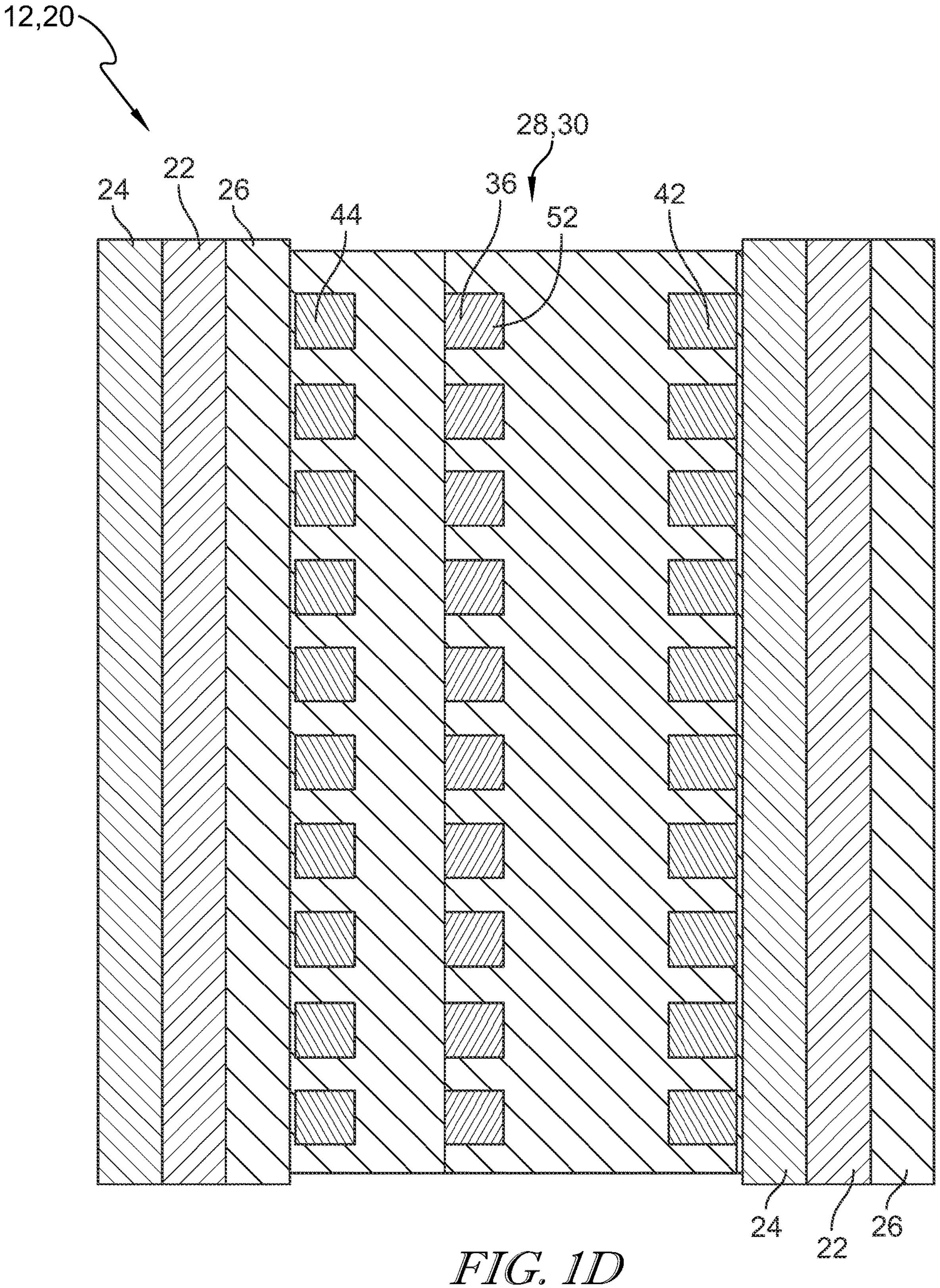
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a hydrogen delivery system and/or a source of hydrogen 19 such as a pressurized tank, including a gaseous pressurized tank, cryogenic liquid storage tank, chemical storage, physical storage, stationary storage, an electrolysis system, or an electrolyzer. In one embodiment, the fuel cell system 10 is connected and/or attached in series or parallel to a hydrogen delivery system and/or a source of hydrogen 19, such as one or more hydrogen delivery systems and/or sources of hydrogen 19 in the BOP 16 (see FIG. 1A). In another embodiment, the fuel cell system 10 is not connected and/or attached in series or parallel to a hydrogen delivery system and/or a source of hydrogen 19.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

Figure 2:
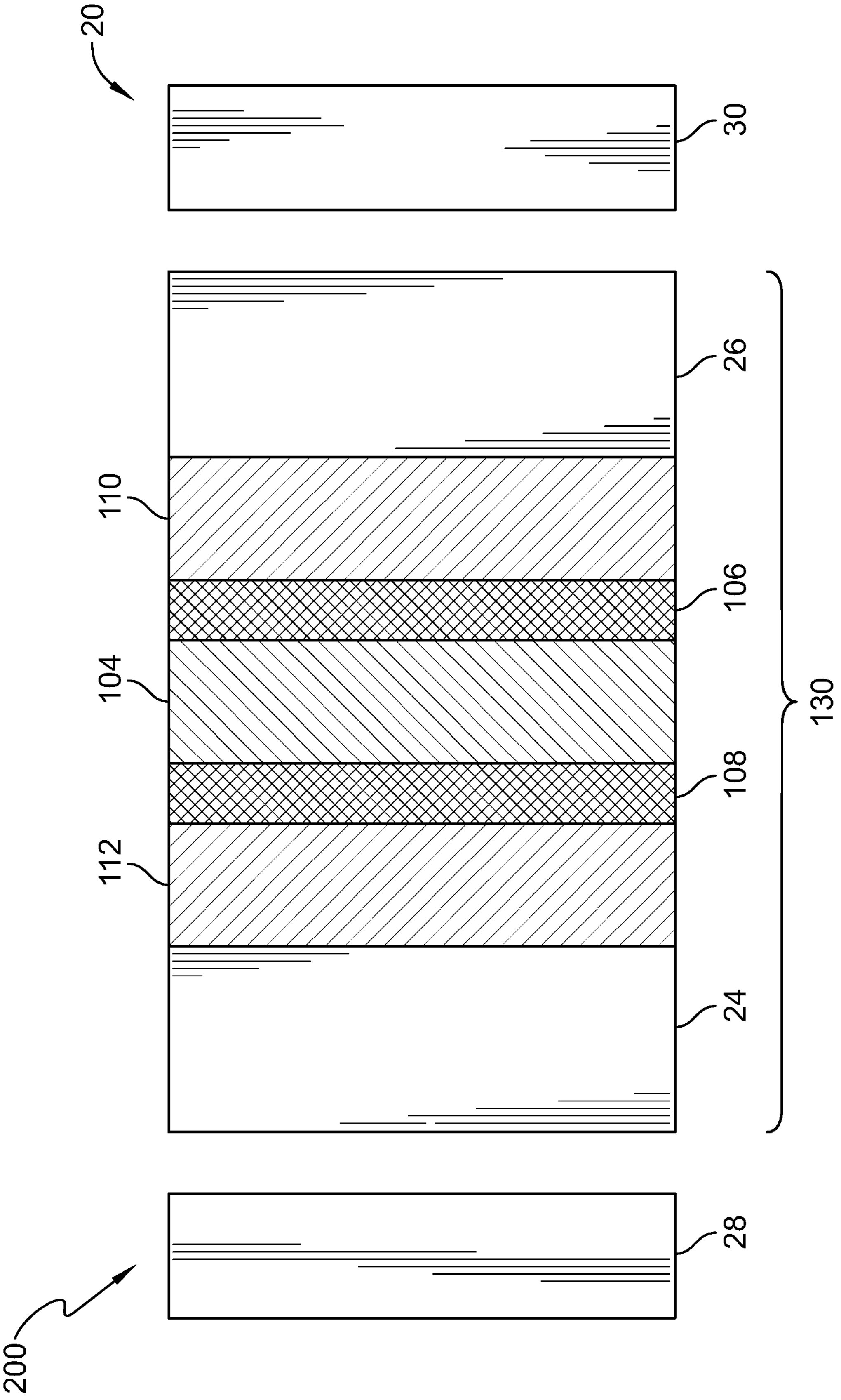
FIG. 2 is a schematic view illustrating an example fuel cell having a plurality of layers.

FIG. 2 illustrates an example implementation 200 of the fuel cell 20. In an example, a plurality of the fuel cells 20 may be combined within the fuel cell stack 12, as described, for example, in reference to at least FIGS. 4A and 4B. The fuel cell 20 includes a plurality of layers 130 disposed between the bipolar plates (BPP) 28, 30. Bipolar plate 28 is also known as an anode current collector plate 28. Bipolar plate 30 is also known as a cathode current collector plate 30. The plurality of layers 130 of the fuel cell 20 include a membrane 104, first and second catalyst layers 106, 108, first and second microporous layers 110, 112, and gas diffusion layers 24, 26. The single membrane electrode assembly (MEA) 22 includes the membrane 104, first and second catalyst layers 106, 108, and first and second microporous layers 110, 112. The MEA 22 (which is typically regarded as a five-layer assembly) and the gas diffusion layers 24, 26 together form the plurality of layers 130, also known as a diffusion-electrode assembly 130.

In one example, the first catalyst layer 106 and the second catalyst layer 108 are disposed on opposite sides of, and adjacent to, the membrane 104. The first microporous layer 110 is disposed between the first catalyst layer 106 and the gas diffusion layer 26 on the cathode side of the fuel cell 20. On the anode 28 side of the fuel cell 20, the second microporous layer 112 is disposed between the second catalyst layer 108 and the gas diffusion layer 24.

Figures 3A, 3B, 3C:
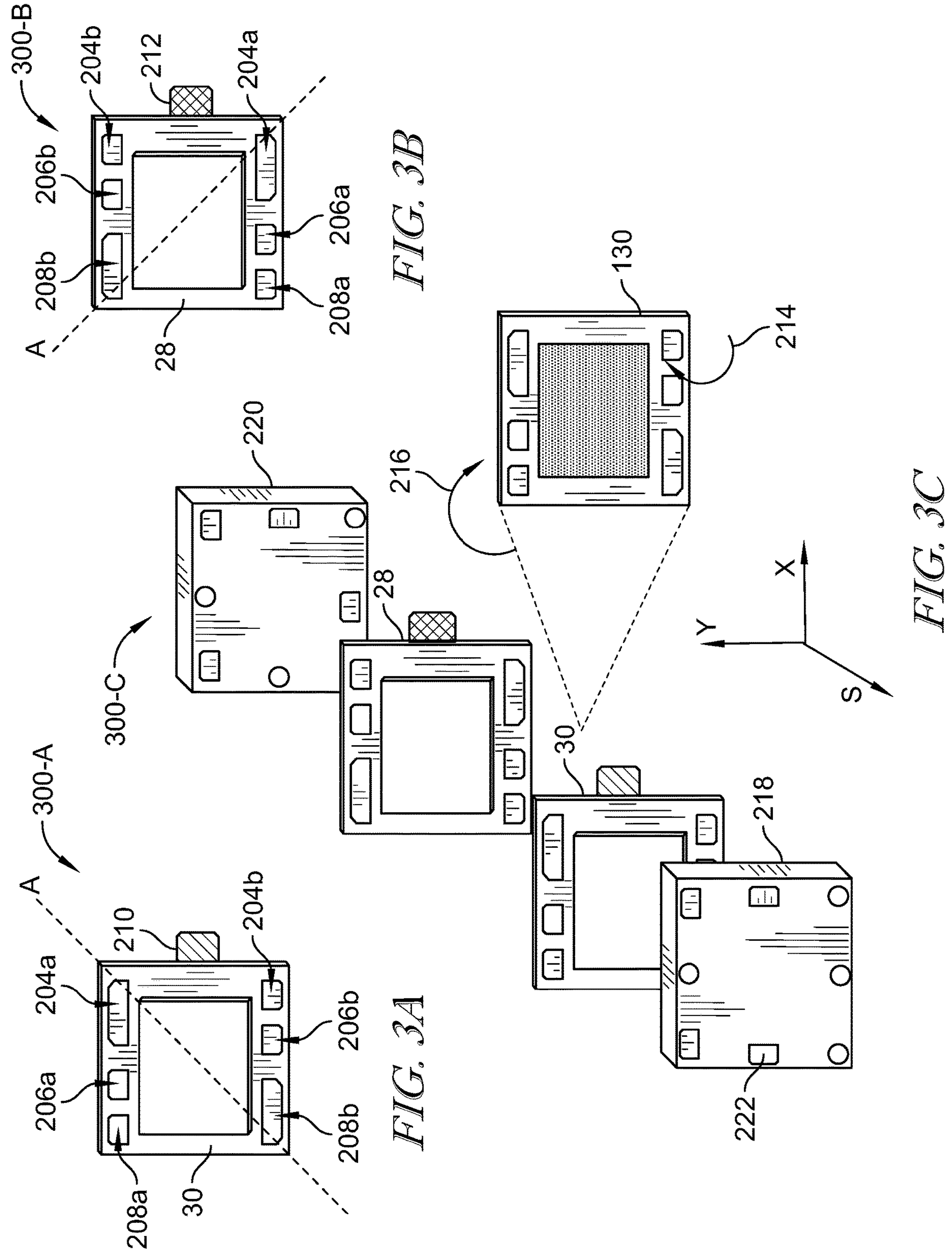
FIGS. 3A and 3B are schematic views illustrating example fuel cell current collector plates.
FIG. 3C is an exploded view of the example fuel cell of FIG. 2 including the example fuel cell current collector plates of FIGS. 3A and 3B.

FIGS. 3A and 3B illustrate example implementations 300-A and 300-B of the cathode current collector plate 30 and the anode current collector plate 28, respectively. In an example, the collector plates 30, 28 each define a plurality of ports 204*a*, 204*b*, 206*a*, 206*b*, 208*a*, 208*b*. The ports 204*a*, 204*b*, 206*a*, 206*b*, 208*a*, 208*b* may be set up for cross flow with respect to a diagonal axis A, such that air directed through the port 204*a* cross-flows to the port 208*b*. The collector plate 30 includes a positive electrical terminal 210 disposed between the ports 204*a*, 204*b* and the collector plate 28 includes a negative electrical terminal 212 disposed between the ports 204*a*, 204*b*.

FIG. 3C illustrates an example exploded view 300-C of the fuel cell stack 12 arranged in a stacking direction S. The cathode current collector plate 30, e.g., the example implementation 300-A of FIG. 3A, is disposed on a current collection side 214 of the diffusion-electrode assembly 130 (e.g., a membrane electrode assembly) and the anode current collector plate 28, e.g., the example implementation 300-B of FIG. 3B, is disposed on a reactant flow side 216 of the diffusion-electrode assembly 130. The diffusion-electrode assembly 130 may be separated from each of the cathode current collector plate 30 and the anode current collector plate 28 by one or more gaskets, flow field plates, and/or insulator plates. A side of the cathode current collector plate 30 facing away from the diffusion-electrode assembly 130 may be disposed adjacent to a cathode endplate 218. A side of the anode current collector plate 28 facing away from the diffusion-electrode assembly 130 may be disposed adjacent to an anode endplate 220. The cathode endplate 218, the cathode current collector plate 30, the diffusion-electrode assembly 130, the anode current collector plate 28, and the anode endplate 220 are all stacked on top of one another to form the fuel cell 20 within the endplates 218, 220, thus forming the fuel cell stack 12. Each of the endplates 218, 220 may define one or more connection ports 222 configured to deliver, transfer, and/or evacuate (or vent) fuel 32 and oxidant 34 to and from the fuel cell 20 via corresponding ducts, hoses, and/or other components coupled thereto, as described, for example, in reference to FIG. 4B.

Figure 4A:
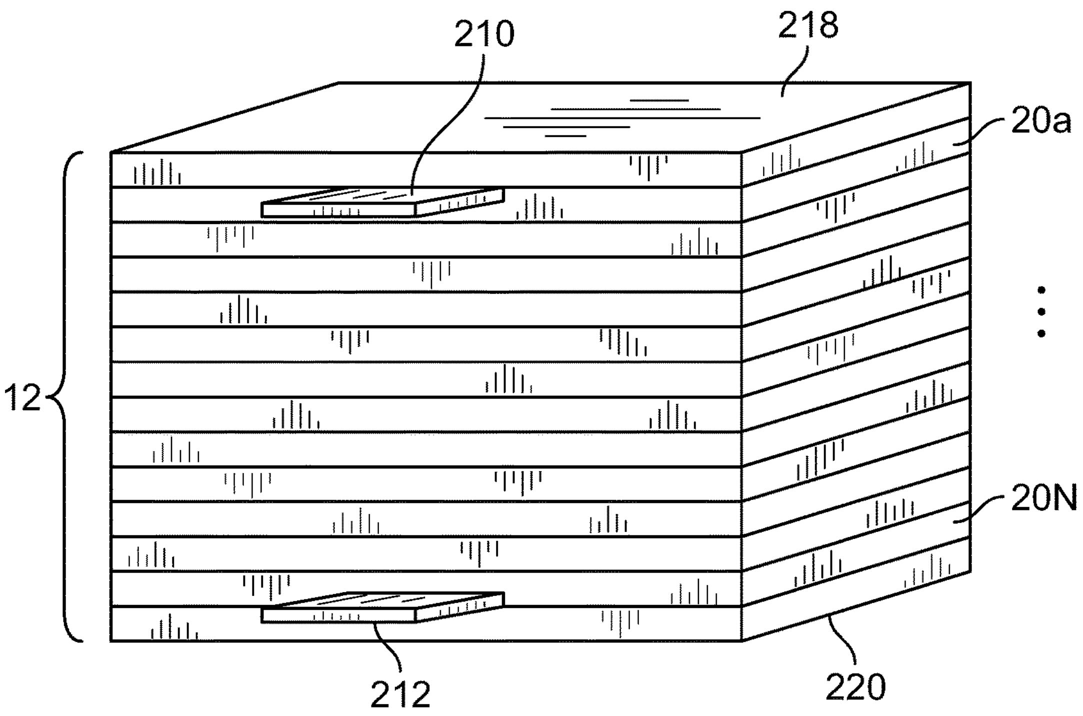
FIG. 4A is a schematic view illustrating an example fuel cell stack including the fuel cell of FIG. 3C.

FIG. 4A illustrates an example implementation of the fuel cell stack 12. The fuel cell stack 12 includes a plurality of individual fuel cells 20 (e.g., fuel cell 20*a* to fuel cell 20N) connected in series between the cathode endplate 218 and the anode endplate 220. The cathode and anode endplates 218, 220 may be configured to reinforce the structural integrity of the fuel cell stack 12 by acting as an anchor for rods and/or bolts used to compress together various components of the fuel cell stack 12 disposed between the cathode and anode endplates 218, 220. In some instances, tie rods may be screwed into threaded bores in the anode endplate 220 and pass through corresponding plain bores in the cathode endplate 218. Alternatively, tie rods may pass through the anode endplate 220 and be fastened using one or more fasteners on a side of the anode endplate 220 facing away from the diffusion-electrode assembly 130. Fasteners, such as, for example, nuts, bolts, washers, and/or the like are provided for clamping together the fuel cell stack 12.

Figure 4B:
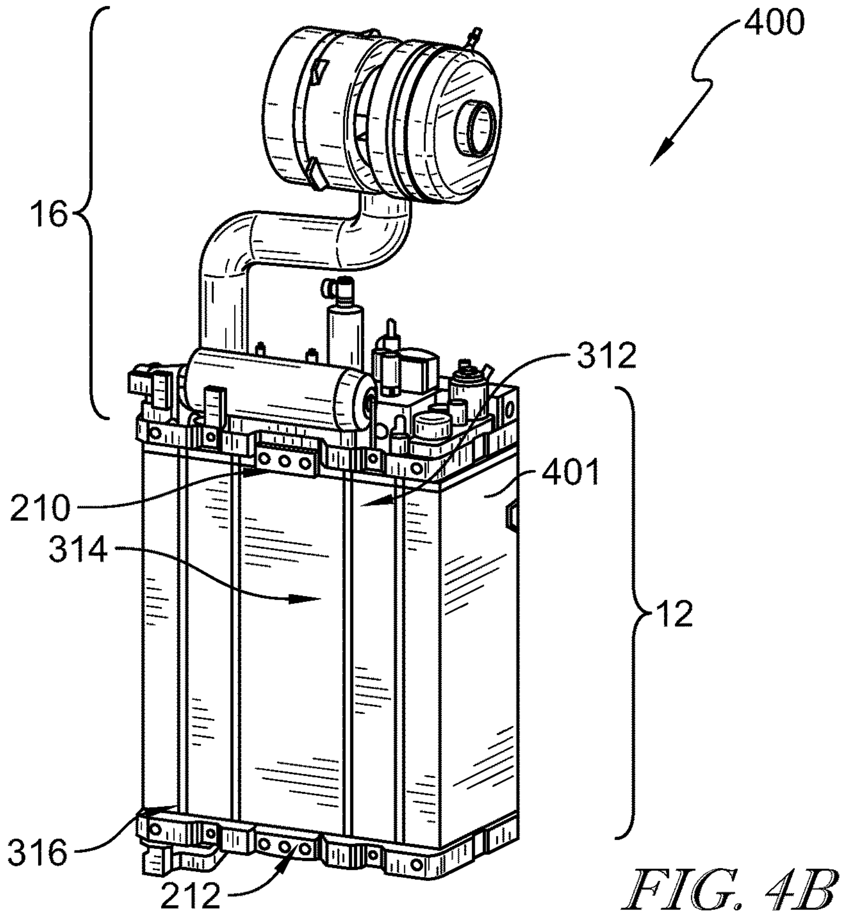
FIG. 4B is a schematic view illustrating an example fuel cell system including the fuel cell stack of FIG. 4A.

FIG. 4B illustrates an example fuel cell system 400 including the fuel cell stack 12 of FIGS. 3C and 4A and the balance of plant (BOP) 16. The example fuel cell system 400 includes a single fuel cell stack 12. The housing 401 of the fuel cell system 400 includes a front wall 314 that includes a top section 312 and a bottom section 316 opposite the top section 312. The positive electrical terminal 210 of the cathode current collector plate 30 and the negative electrical terminal 212 of the anode current collector plate 28 are both located on the front wall 314 of the housing 401. The positive electrical terminal 210 of the cathode current collector plate 30 is located near the top section 312 of the front wall 314. The negative electrical terminal 212 of the anode current collector plate 28 is located near the bottom section 316 of the front wall 314. The BOP 16 may be configured to monitor and control operation of the fuel cell stack 12 to cause the fuel cell stack 12 to produce power. Design of the fuel cell system 400 may vary based on the application of the fuel cell stack 12 power and may be implemented to operate with a predefined efficiency.

The BOP 16 may be configured to monitor temperature, pressure, water, and/or heat of the fuel cell stack 12, using, for example, sensors and pressure transducers, thermocouples, pressure transducers, methanol/hydrogen sensors, and/or mass flow controllers. The BOP 16 may include one or more fuel processing units configured to monitor and control features of the reactants 32, 34, such as pressure, temperature (cooling and/or heating) and humidity, transferred around the fuel cell system 400 prior to being delivered to the fuel cell 20. Fuel 32 circulation and monitoring may be provided using one or more blowers, compressors, pumps, and/or humidification system components. One or more turbines of the BOP 16 may be configured to harness energy from heated exhaust gases output by the fuel cell 20.

The BOP 16 may include a humidifier that operates to prevent dehydration of the fuel cell 20 by humidifying a hydrogen gas inlet stream. Water management in the fuel cell 20 may be challenging due to ohmic heating under high current flow, which may dry out the membrane 104 and slow ionic transport. Fuel cell stacks 12 that are not operating near the maximum power constantly may not require any humidification, or the fuel cell stack 12 may be able to self-humidify. In larger fuel cell systems, either air 34 or hydrogen 32, or both, must be humidified at fuel inlets. The BOP 16 may include one or more power regulation components, such as voltage regulators, DC/DC converters, chopper circuits, and/or inverters configured to convert direct current (DC) generated by the fuel cells 20 to alternating current (AC). The output of the fuel cells 20 is a DC voltage and is useful for many applications such as AC grid-connected power generation, and AC- or DC-independent loads.

While a stationary fuel cell system 400 is illustrated and described in reference to FIG. 4B, the fuel cell system 400 design disclosed herein is not so limited. Example applications of the systems and methods for operating a fuel cell system 400 in accordance with the present disclosure include, but are not limited to, stationary or semi-stationary applications in personal, residential, and/or industrial context. Example non-stationary applications of the system and method of the present disclosure include vehicular and mobile applications, whether operator-controlled, autonomous, or semi-autonomous, such as, but are not limited to, automobiles, vans, trucks, agricultural machinery and equipment, trains, marine vehicles, aircraft, spacecraft, satellite, and drone.

Figure 6:
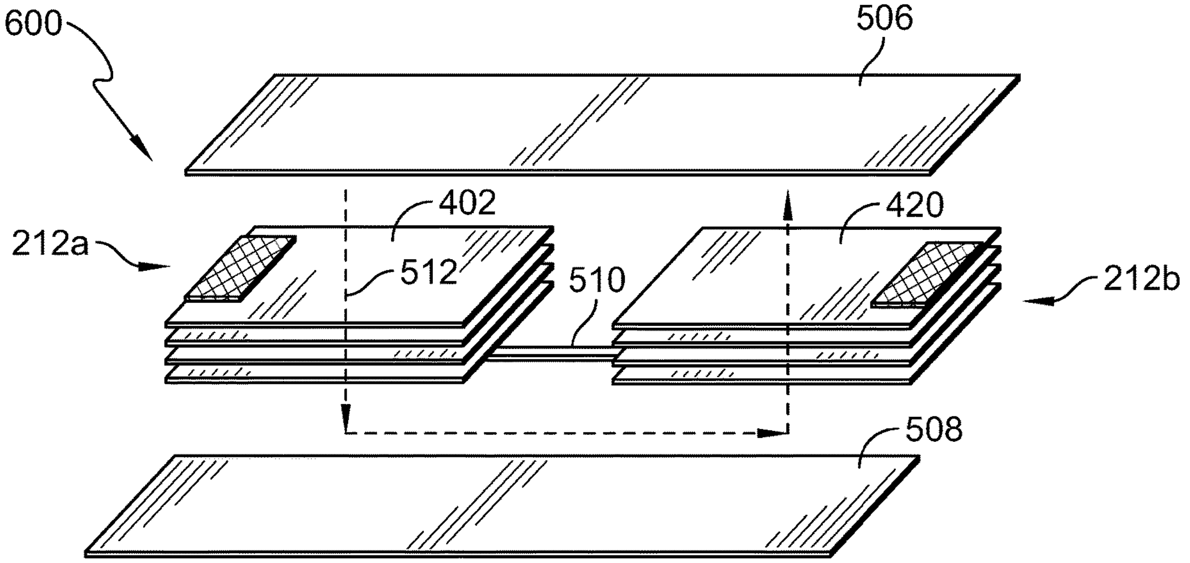
FIG. 6 is a schematic view illustrating example fuel cell stacks including the mirrored fuel cell current collector plates of FIGS. 5A and 5B.

To increase the power density of a fuel cell system, multiple fuel cell stacks 212 may be used within a single pair of end plates 506, 508, as shown in FIG. 6. The fuel cell stacks 212 are similar to the fuel cell stacks 12, but the fuel cell stacks 212 do not include the anode current collector plate 28 and the cathode current collector plate 30. Instead, the fuel cell stacks 212 include one mirrored current collector plate 402, 420. Otherwise, the fuel cell stacks 212 are identical to the fuel cell stacks 12. To include multiple fuel cell stacks 12 in the fuel cell system 400, described in reference to at least FIGS. 4A and 4B, one cathode endplate 218 and one anode endplate 220 are required for a first fuel cell stack 12*a*, and one cathode endplate 218 and one anode endplate 220 are required for a second fuel cell stack 12*b*. Thus, for the fuel cell system 400 to have two fuel cell stacks 12, a total of two cathode endplates 218 and two anode endplates 220 are required. Thus, for the fuel cell system 400 to have two fuel cell stacks 12, a total of four endplates are required.

The single pair of end plates 506, 508 ensures that only two end plates 506, 508 are required for multiple fuel cell stacks 212. Thus, for a fuel cell system 700 including two fuel cell stacks 212, which will be described in more detail below, a total of two endplates are required.

Figures 5A, 5B:
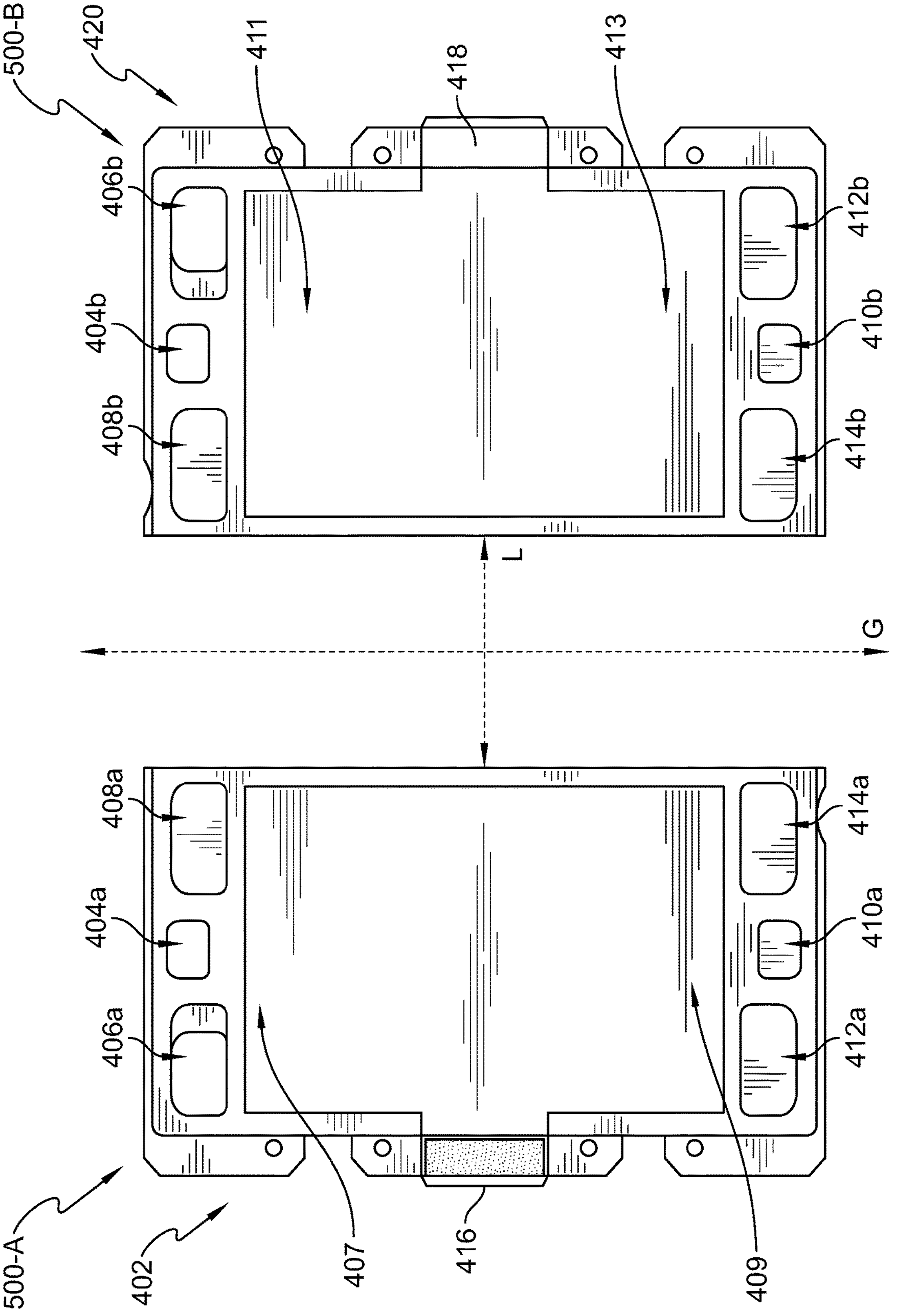
FIGS. 5A and 5B are schematic views illustrating example mirrored fuel cell current collector plates.

In order to use the single pair of end plates 506, 508 for multiple fuel cell stacks 212, mirrored current collector plates 402, 420 are used in the fuel cell stacks 212 instead of the cathode current collector plate 30 and the anode current collector plate 28. FIG. 5A illustrates an example implementation 500-A of a mirrored cathode current collector plate 402. FIG. 5B illustrates an example implementation 500-B of a mirrored anode current collector plate 420. The cathode current collector plate 30 and the anode current collector plate 28 described in reference to at least FIGS. 3A and 3B are used on opposing ends of a single fuel cell stack 12, whereas the mirrored current collector plates 402, 420 are used in two fuel cell stacks 212 that are adjacent to one another. For example, the mirrored cathode current collector plate 402 may be included in a first fuel cell stack 212*a* and the mirrored anode current collector plate 420 may be included in a second fuel cell stack 212*b*, where the current collector plates 402, 420 are aligned adjacent to one another. The mirrored cathode current collector plate 402 is a mirror image of the mirrored anode current collector plate 420 relative to a longitudinal axis G.

As one example, the mirrored cathode current collector plate 402 defines a plurality of ports 404*a*, 406*a*, 408*a*, 410*a*, 412*a*, 414*a* as shown in FIG. 5A. As one example, the mirrored anode current collector plate 420 defines a plurality of ports 404*b*, 406*b*, 408*b*, 410*b*, 412*b*, 414*b* as shown in FIG. 5B. A layout of the ports 404*a*, 406*a*, 408*a*, 410*a*, 412*a*, 414*a* of the mirrored cathode current collector plate 402 may be a mirror image, with respect to the longitudinal axis G, of a layout of the ports 404*b*, 406*b*, 408*b*, 410*b*, 412*b*, 414*b* of the mirrored anode current collector plate 420. The layout of the ports 404*a*, 406*a*, 408*a* on a top half 407 of the mirrored cathode current collector plate 402 may be a mirror image of the layout of the ports 410*a*, 412*a*, 414*a* on a bottom half 409 of the mirrored cathode current collector plate 402 with respect to a lateral axis L. The layout of the ports 404*b*, 406*b*, 408*b* on a top half 411 of the mirrored anode current collector plate 420 may be a mirror image of the layout of the ports 410*b*, 412*b*, 414*b* on a bottom half 413 of the mirrored anode current collector plate 420 with respect to the lateral axis L.

The mirrored cathode current collector plate 402 includes a positive electrical terminal 416. The mirrored anode current collector plate 420 includes a negative electrical terminal 418.

FIG. 6 illustrates an example implementation 600 for connecting the first fuel cell stack 212*a* and the second fuel cell stack 212*b* using the first endplate 506 and the second endplate 508. The first fuel cell stack 212*a* includes at least one mirrored cathode current collector plate 402, as described in reference to FIGS. 5A and 5B, and the second fuel cell stack 212*b* includes at least one mirrored anode current collector plate 420, as described in reference to FIGS. 5A and 5B. The mirrored cathode current collector plate 402 of the first fuel cell stack 212*a* is adjacent to the mirrored anode current collector plate 420 of the second fuel cell stack 212*b*. The current collector plates 402, 420 are located on the same plane. The first fuel cell stack 212*a* and the second fuel cell stack 212*b* may be electrically connected with one another, such as, for example, via a bus bar 510. An example flow of electrical current 512 flows between the mirrored cathode current collector plate 402 of the first fuel cell stack 212*a* and the mirrored anode current collector plate 420 of the second fuel cell stack 212*b*.

Figure 7:
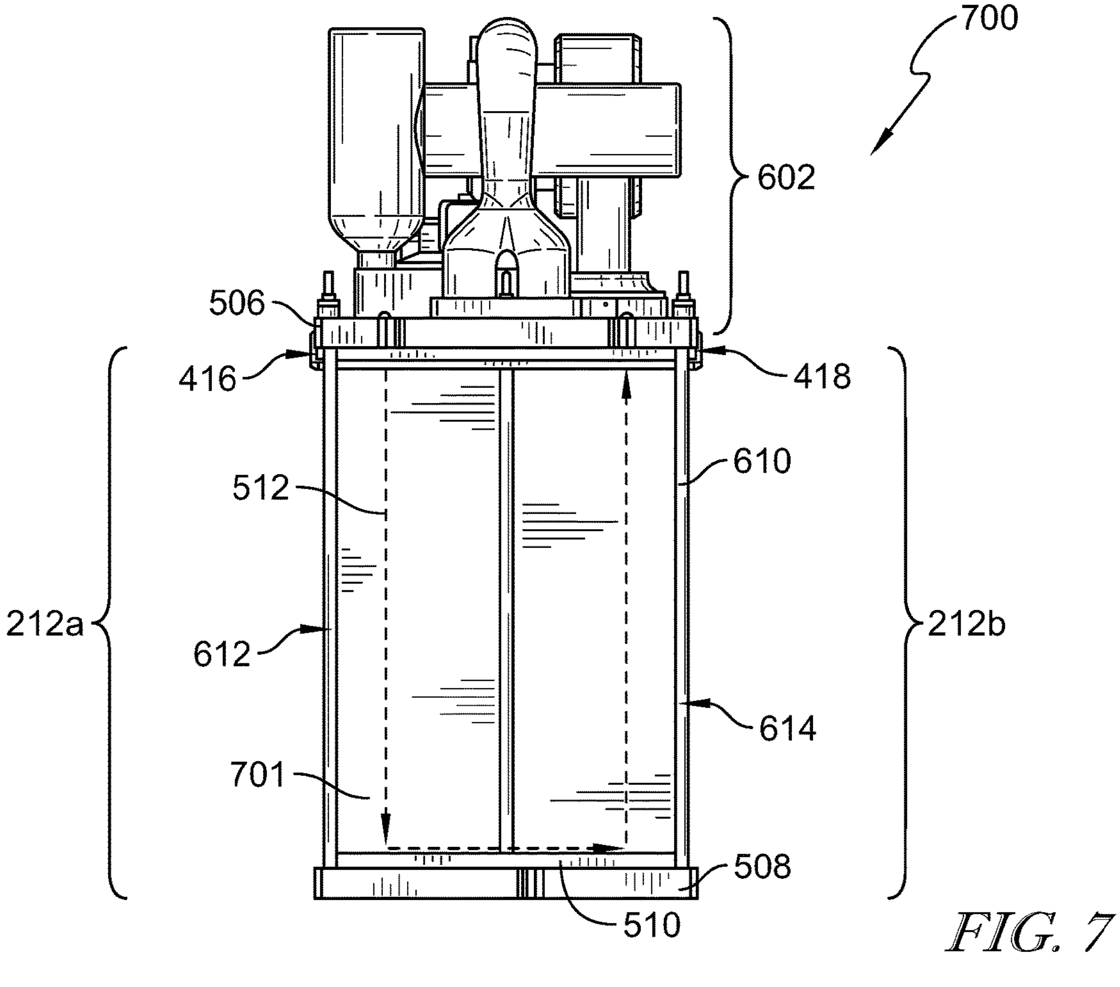
FIG. 7 is a schematic view illustrating an example fuel cell system including the fuel cell stacks of FIG. 6.

FIG. 7 illustrates the example fuel cell system 700 including a BOP 602 and a plurality of fuel cell stacks 212. The BOP 602 may be the same as and/or similar to the BOP 16, and in other embodiments, may not be the same as and/or similar to the BOP 16. The plurality of fuel cell stacks 212 includes two fuel cell stacks 212, e.g., the first fuel cell stack 212*a* and the second fuel cell stack 212*b*. In another example, the plurality of fuel cell stacks 212 may include four fuel cell stacks 212. Moreover, another number of fuel cell stacks 212, such as, 8, 16, 32, and so on, is also contemplated. The plurality of fuel cell stacks 212 includes at least one mirrored cathode current collector plate 402 and at least one mirrored anode current collector plate 420, as described in reference to FIGS. 5A and 5B. The first fuel cell stack 212*a* and the second fuel cell stack 212*b* may be electrically coupled in series, such as, for example, using the bus bar 510.

The BOP 602 is configured to monitor and control operation of the plurality of the fuel cell stacks 212. In one example, the BOP 602 is configured to couple to at least one of the first endplate 506 and the second endplate 508, such as via corresponding ducts, hoses, and/or other components coupled to one or more respective ports of the first endplate 506 and the second endplate 508, to deliver, transfer, and/or evacuate (or vent) fuel 32 and oxidant 34 to and from the plurality of fuel cell stacks 212. In this manner, the BOP 602 is configured to monitor and control operation of the plurality of fuel cell stacks 212 via one pair of endplates 506, 508.

The fuel cell system 700 includes tie rods 610 configured to secure together and maintain compression between and among the plurality of fuel cell stacks 212. The fuel cell system 700 includes the positive electrical terminal 416 disposed about a first lateral side 612 of a housing 701 of the fuel cell system 700 and the negative electrical terminal 418 disposed about a second lateral side 614 of the housing 701 of the fuel cell system 700. The first lateral side 612 is located opposite the second lateral side 614. The flow of electrical current 512 is to and from and between the plurality of fuel cell stacks 212*a*, 212*b*. In this manner, the BOP 602 is configured to monitor and control operation of the plurality of fuel cell stacks 212 via one pair of endplates 506, 508.

Figure 8:
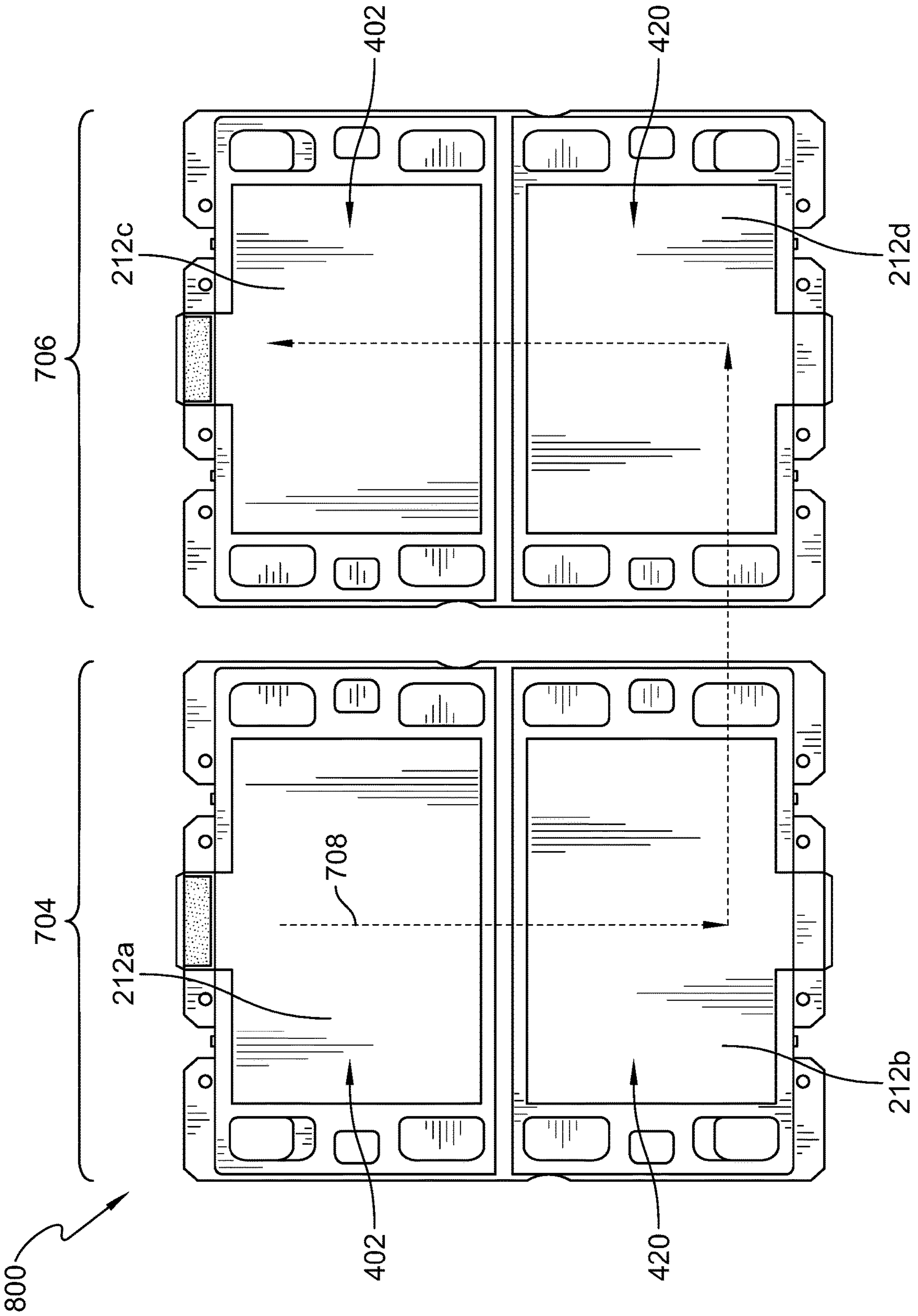
FIG. 8 is a schematic view illustrating a plurality of the mirrored fuel cell current collector plates of FIGS. 5A and 5B.

As illustrated in FIG. 8, an example fuel cell system 800 may include four fuel cell stacks 212*a*, 212*b*, 212*c*, 212*d*. In one example, the first fuel cell stack 212*a* and the second fuel cell stack 212*b* may be electrically coupled in series with one another, providing a first stack pair 704, and a third fuel cell stack 212*c* and a fourth fuel cell stack 212*d* may be electrically coupled in series with one another, providing a second stack pair 706. The first stack pair 704 and the second stack pair 706 may be electrically coupled in parallel with one another, such that the mirrored current collector plates 402, 420 of the first stack pair 704 and the mirrored current collector plates 402, 420 the second stack pair 706 may be linked. An example flow of electrical current 708 is to and from and between the plurality of fuel cell stacks 212*a*, 212*b*, 212*c*, 212*d*.

Figure 9:
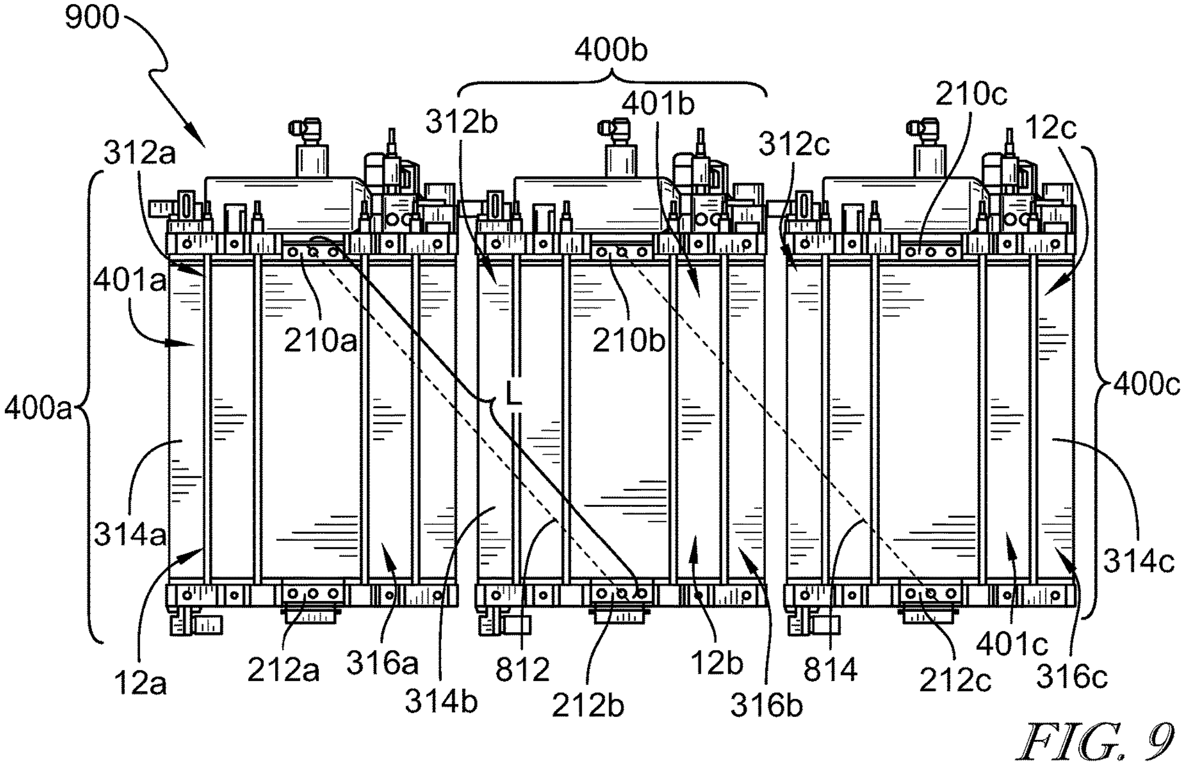
FIG. 9 is a schematic view illustrating a plurality of fuel cell systems of FIG. 4B.

FIG. 9 illustrates an example implementation 900 of a plurality of fuel cell systems 400*a*, 400*b*, 400*c* electrically coupled in series with one another. The fuel cell systems 400*a*, 400*b*, 400*c* are each the fuel cell system 400 of FIG. 4B. Each fuel cell system 400*a*, 400*b*, 400*c* includes a single fuel cell stack 12, such that the example implementation 900 includes three fuel cell stacks 12. Each of the first fuel cell system 400*a*, the second fuel cell system 400*b*, and the third fuel cell system 400*c* includes a corresponding positive electrical terminal 210 and a corresponding negative electrical terminal 212. As described, for example, in reference to FIGS. 4A and 4B, the positive electrical terminal 210*a* and the negative electrical terminal 212*a* of the first fuel cell system 400*a* may be disposed about opposite ends of the front wall 314*a* of the housing 401*a* (e.g., the top section 312*a* and the bottom section 316*a*, respectively) of the first fuel cell system 400*a*.

To establish a series connection between the first fuel cell system 400*a* and the second fuel cell system 400*b*, the positive electrical terminal 210*a* of the first fuel cell system 400*a* is electrically coupled 812 to the negative electrical terminal 212*b* of the second fuel cell system 400*b*. Likewise, to establish a series connection between the second fuel cell system 400*b* and the third fuel cell system 400*c*, the positive electrical terminal 210*b* of the second fuel cell system 400*b* is electrically coupled 814 to the negative electrical terminal 212*c* of the third fuel cell system 400*c*. A length L of electrical couplings 812, 814, such as, for example, an electric wiring harness, may extend between opposite ends of the front wall 314 of the housings 401 (e.g., between the top section 312*a* of the housing 401*a* of the first fuel cell system 400*a* and the bottom section 316*b* of the housing 401*b* of the second fuel cell system 400*b*).

Figure 10:
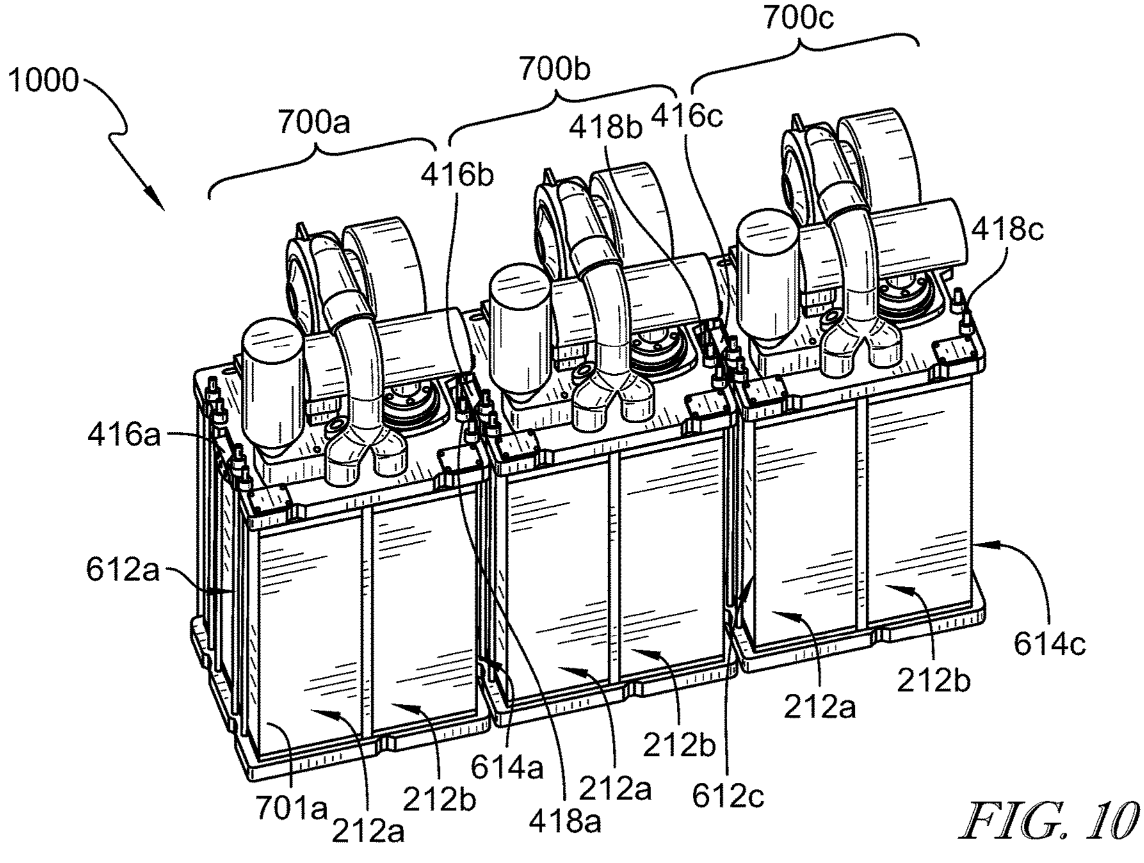
FIG. 10 is a schematic view illustrating a plurality of fuel cell systems of FIG. 7.

FIG. 10 illustrates an example implementation 1000 of a plurality of fuel cell systems 700*a*, 700*b*, 700*c* electrically coupled in series with one another. The fuel cell systems 700*a*, 700*b*, 700*c* are each the fuel cell system 700 shown in FIG. 7. Each fuel cell system 700 includes at least two fuel cell stacks 212*a*, 212*b*. Each of the fuel cell stacks 212*a*, 212*b* of each of the fuel cell systems 700 includes at least one mirrored cathode current collector plate 402 and at least one mirrored anode current collector plate 420, as described, for example, in reference to FIGS. 5A and 5B.

Each of a first fuel cell system 700*a*, a second fuel cell system 700*b*, and a third fuel cell system 700*c* includes a corresponding positive electrical terminal 416 and a corresponding negative electrical terminal 418. As described, for example, in reference to FIGS. 5A, 5B, 6, and 7, the positive electrical terminal 416*a* and the negative electrical terminal 418*a* of the first fuel cell system 700*a* may be disposed about the first lateral side 612*a* and about the second lateral side 614*a* of the housing 701*a* of the first fuel cell system 700*a*, respectively. The first lateral side 612*a* of the housing 701*a* is disposed opposite the second lateral side 614*a* of the housing 701*a*. In this manner, the systems 700 having mirrored current collector plates 402, 420 allows direct coupling of the positive and negative terminals 416, 418 of adjacent fuel cell systems 700 without requiring additional conductors (e.g., the electrical couplings 812, 814 of FIG. 9) to form a compact assembly of multiple fuel cell modules 14. For example, the negative electrical terminal 418*a* of the mirrored anode current collector plate 420*a* of the fuel cell stack 12*b* included in the first fuel cell system 700*a* couples with the positive electrical terminal 416*b* of the mirrored cathode current collector plate 402*b* of the fuel cell stack 12*a* included in the second fuel cell system 700*b*. The negative electrical terminal 418*b* of the mirrored anode current collector plate 420*b* of the fuel cell stack 12*b* included in the second fuel cell system 700*b* couples with the positive electrical terminal 416*c* of the mirrored cathode current collector plate 402*c* of the fuel cell stack 12*a* included in the third fuel cell system 700*c*.

The following described aspects of the present invention are contemplated and non-limiting:

A first aspect of the present invention relates to a system. The system comprises a plurality of fuel cell stacks, a balance of plant (BOP), a first endplate, and a second endplate. Each of the plurality of fuel cell stacks includes at least one fuel cell. The balance of plant (BOP) is configured to monitor and control operation of the plurality of the fuel cell stacks. The BOP is operatively coupled to at least one of the first endplate and the second endplate to deliver, transfer, and vent fuel and oxidant to and from the plurality of fuel cell stacks. A first fuel cell stack of the plurality of fuel cell stacks and a second fuel cell stack of the plurality of fuel cell stacks are both located between the first endplate and the second endplate.

A second aspect of the present invention relates to a system. The system includes a housing and a balance of plant (BOP). The housing encloses a plurality of fuel cell stacks, wherein each fuel cell stack of the plurality of fuel cell stacks includes at least one fuel cell. The balance of plant (BOP) is configured to monitor and control operation of the plurality of the fuel cell stacks. The BOP is operatively coupled to deliver, transfer, and vent fuel and oxidant to and from the plurality of fuel cell stacks.

A third aspect of the present invention relates to a system. The system comprises a first fuel cell and a second fuel cell. The first fuel cell includes a first fuel cell plate defining a first plurality of ports configured to deliver, transfer, and vent fuel and oxidant to and from the first fuel cell. The second fuel cell includes a second fuel cell plate defining a second plurality of ports configured to deliver, transfer, and vent fuel and oxidant to and from the second fuel cell. The first plurality of ports of the first fuel cell plate is a mirror image of the second plurality of ports of the second fuel cell plate relative to a longitudinal axis. The first fuel cell plate of the first fuel cell and the second fuel cell plate of the second fuel cell are located adjacent to one another such that positioning the first fuel cell in a first fuel cell stack and positioning the second fuel cell in a second fuel cell stack allows one balance of plant (BOP) to monitor and control operation of both the first fuel cell stack and the second fuel cell stack.

In the first aspect of the present invention, the at least one fuel cell of the first fuel cell stack of the plurality of fuel cell stacks may include a mirrored cathode current collector plate including a first end and a second end opposite the first end and the at least one fuel cell of the second fuel cell stack of the plurality of fuel cell stacks may include a mirrored anode current collector plate including a first end and a second end opposite the first end, and wherein the mirrored cathode current collector plate and the mirrored anode current collector plate may be located side by side such that the second end of the mirrored cathode current collector plate may be placed next to the first end of the mirrored anode current collector plate.

In the first aspect of the present invention, the mirrored cathode current collector plate of the first fuel cell stack of the plurality of fuel cell stacks may be a mirror image of the mirrored anode current collector plate of the second fuel cell stack of the plurality of fuel cell stacks relative to a longitudinal axis.

In the first aspect of the present invention, each of the mirrored cathode current collector plate and the mirrored anode current collector plate may define a plurality of ports, and wherein a first plurality of ports of the mirrored cathode current collector plate may be a mirror image of a second plurality of ports of the mirrored anode current collector plate relative to the longitudinal axis.

In the first aspect of the present invention, the first plurality of ports of the mirrored cathode current collector plate may include a first port located on a top half of the mirrored cathode current collector plate and a second port located on a bottom half of the mirrored cathode current collector plate, wherein the first port and the second port may be symmetric with one another relative to a lateral axis that is perpendicular to the longitudinal axis.

In the first aspect of the present invention, at least one of the first endplate and the second endplate may be a cathode endplate, and wherein the other of the at least one of the first endplate and the second endplate may be an anode endplate. In the first aspect of the present invention, the BOP may be coupled to at least one of the first endplate and the second endplate using one of ducts or hoses.

In the first aspect of the present invention, the plurality of fuel cell stacks may include at least plurality of fuel cell stacks includes at least the first fuel cell stack, the second fuel cell stack, a third fuel cell stack, and a fourth fuel cell stack. In the first aspect of the present invention, the first fuel cell stack of the plurality of fuel cell stacks may be electrically coupled to the second fuel cell stack of the plurality of fuel cell stacks via a bus bar.

In the second aspect of the present invention, the system may further comprise a first endplate on a top side of the plurality of fuel cell stacks and a second endplate on a bottom side opposite the top side of the plurality of fuel cell stacks, wherein the BOP may be coupled to the plurality of fuel cells stacks via at least one of the first endplate and the second endplate.

In the second aspect of the present invention, at least one fuel cell of a first fuel cell stack of the plurality of fuel cell stacks may include a mirrored cathode current collector plate and the at least one fuel cell of a second fuel cell stack of the plurality of fuel cell stacks may include a mirrored anode current collector plate, the mirrored cathode current collector plate of the first fuel cell stack and the mirrored anode current collector plate of the second fuel cell stack may be located side by side.

In the second aspect of the present invention, the mirrored cathode current collector plate of the first fuel cell stack may be a mirror image of the mirrored anode current collector plate of the second fuel cell stack relative to a longitudinal axis. In the second aspect of the present invention, each of the mirrored cathode current collector plate and the mirrored anode current collector plate may define a plurality of ports, and wherein a first plurality of ports of the mirrored cathode current collector plate may be a mirror image of a second plurality of ports of the mirrored anode current collector plate relative to the longitudinal axis.

In the second aspect of the present invention, the mirrored cathode current collector plate of the first fuel stack may include a positive electrical terminal and the mirrored anode current collector plate of the second fuel cell stack may include a negative electrical terminal, and wherein the positive electrical terminal may be disposed on a first wall of the housing and the negative electrical terminal may be disposed on a second wall of the housing, the second wall may be opposite the first wall.

In the second aspect of the present invention, the housing and the BOP may comprise a first fuel cell module, and wherein positioning the first fuel cell module adjacent to a second fuel cell module including a corresponding housing and BOP may allow direct coupling of the negative electrical terminal of the first fuel cell module with a positive electrical terminal of the second fuel cell module without additional conductors to form a compact assembly of multiple fuel cell modules.

In the third aspect of the present invention, the first fuel cell plate may be a cathode current collector plate and the second fuel cell plate may be an anode current collector plate. In the third aspect of the present invention, the cathode current collector plate of the first fuel cell may include a positive electrical terminal and the anode current collector plate of the second fuel cell may include a negative electrical terminal.

In the third aspect of the present invention, the system may further comprise a housing enclosing the first fuel cell stack and the second fuel cell stack such that the positive electrical terminal of the first fuel cell may be disposed about a first wall of the housing and the negative electrical terminal of the second fuel cell may be disposed about a second wall of the housing, the first wall being disposed opposite the second wall.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system consisting of:

a plurality of fuel cell stacks, wherein each of the plurality of fuel cell stacks includes at least one fuel cell;

a balance of plant (BOP) configured to monitor and control operation of the plurality of the fuel cell stacks;

a first endplate and a second endplate; and a mirrored cathode current collector plate and a mirrored anode current collector plate;

wherein the BOP is operatively coupled to at least one of the first endplate and the second endplate to deliver, transfer, and vent fuel and oxidant to and from the plurality of fuel cell stacks, wherein a first fuel cell stack of the plurality of fuel cell stacks and a second fuel cell stack of the plurality of fuel cell stacks are both located between the first endplate and the second endplate, wherein the mirrored cathode current collector plate is located in the first fuel cell stack between the first and second endplates and the mirrored anode current collector plate is located in the second fuel cell stack between the first and second endplates.

2. The system of claim 1, wherein the mirrored cathode current collector plate includes a first end and a second end opposite the first end and the mirrored anode current collector plate includes a first end and a second end opposite the first end, and wherein the mirrored cathode current collector plate and the mirrored anode current collector plate are located side by side such that the second end of the mirrored cathode current collector plate is placed next to the first end of the mirrored anode current collector plate.

3. The system of claim 2, wherein the mirrored cathode current collector plate of the first fuel cell stack of the plurality of fuel cell stacks is a mirror image of the mirrored anode current collector plate of the second fuel cell stack of the plurality of fuel cell stacks relative to a longitudinal axis.

4. The system of claim 3, wherein each of the mirrored cathode current collector plate and the mirrored anode current collector plate defines a plurality of ports, and wherein a first plurality of ports of the mirrored cathode current collector plate is a mirror image of a second plurality of ports of the mirrored anode current collector plate relative to the longitudinal axis.

5. The system of claim 4, wherein the first plurality of ports of the mirrored cathode current collector plate includes a first port located on a top half of the mirrored cathode current collector plate and a second port located on a bottom half of the mirrored cathode current collector plate, wherein the first port and the second port are symmetric with one another relative to a lateral axis that is perpendicular to the longitudinal axis.

6. The system of claim 1, wherein at least one of the first endplate and the second endplate is a cathode endplate, and wherein the other of the at least one of the first endplate and the second endplate is an anode endplate.

7. The system of claim 6, wherein the BOP is coupled to at least one of the first endplate and the second endplate using one of ducts or hoses.

8. The system of claim 1, wherein the plurality of fuel cell stacks includes at least the first fuel cell stack, the second fuel cell stack, a third fuel cell stack, and a fourth fuel cell stack.

9. A system comprising:

a housing enclosing a plurality of fuel cell stacks, wherein each fuel cell stack of the plurality of fuel cell stacks includes at least one fuel cell;

a first endplate and a second endplate;

a mirrored cathode current collector plate and a mirrored anode current collector plate; and a balance of plant (BOP) configured to monitor and control operation of the plurality of the fuel cell stacks, wherein the BOP is operatively coupled to deliver, transfer, and vent fuel and oxidant to and from the plurality of fuel cell stacks, wherein a first fuel cell stack of the plurality of fuel cell stacks and a second fuel cell stack of the plurality of fuel cell stacks are both located between the first endplate and the second endplate.

10. The system of claim 9, wherein the first fuel cell stack of the plurality of fuel cell stacks is electrically coupled to the second fuel cell stack of the plurality of fuel cell stacks via a bus bar.

11. The system of claim 9, wherein the first endplate is located on a top side of the plurality of fuel cell stacks and the second endplate is located on a bottom side opposite the top side of the plurality of fuel cell stacks, wherein the BOP is coupled to the plurality of fuel cells stacks via at least one of the first endplate and the second endplate.

12. The system of claim 9, wherein the at least one fuel cell of the first fuel cell stack of the plurality of fuel cell stacks includes the mirrored cathode current collector plate and the at least one fuel cell of the second fuel cell stack of the plurality of fuel cell stacks includes the mirrored anode current collector plate, the mirrored cathode current collector plate of the first fuel cell stack and the mirrored anode current collector plate of the second fuel cell stack being located side by side.

13. The system of claim 12, wherein the mirrored cathode current collector plate of the first fuel cell stack is a mirror image of the mirrored anode current collector plate of the second fuel cell stack relative to a longitudinal axis.

14. The system of claim 13, wherein each of the mirrored cathode current collector plate and the mirrored anode current collector plate defines a plurality of ports, and wherein a first plurality of ports of the mirrored cathode current collector plate is a mirror image of a second plurality of ports of the mirrored anode current collector plate relative to the longitudinal axis.

15. The system of claim 12, wherein the mirrored cathode current collector plate of the first fuel stack includes a positive electrical terminal and the mirrored anode current collector plate of the second fuel cell stack includes a negative electrical terminal, and wherein the positive electrical terminal is disposed on a first wall of the housing and the negative electrical terminal is disposed on a second wall of the housing, the second wall being opposite the first wall, and wherein the housing extends entirely around the plurality of fuel cell stacks.

16. The system of claim 15, wherein the housing and the BOP comprise a first fuel cell module, and wherein positioning the first fuel cell module adjacent to a second fuel cell module including a corresponding housing and BOP allows direct coupling of the negative electrical terminal of the first fuel cell module with a positive electrical terminal of the second fuel cell module without additional conductors to form a compact assembly of multiple fuel cell modules.

17. A system comprising:

a first endplate and a second endplate;

a first fuel cell including a first fuel cell plate defining a first plurality of ports configured to deliver, transfer, and vent fuel and oxidant to and from the first fuel cell; and a second fuel cell including a second fuel cell plate defining a second plurality of ports configured to deliver, transfer, and vent fuel and oxidant to and from the second fuel cell, wherein the first plurality of ports of the first fuel cell plate is a mirror image of the second plurality of ports of the second fuel cell plate relative to a longitudinal axis, wherein the first fuel cell plate of the first fuel cell and the second fuel cell plate of the second fuel cell are located adjacent to one another such that positioning the first fuel cell in a first fuel cell stack and positioning the second fuel cell in a second fuel cell stack allows one balance of plant (BOP) to monitor and control operation of both the first fuel cell stack and the second fuel cell stack, wherein the first fuel cell stack and the second fuel cell stack are both located between the first endplate and the second endplate.

18. The system of claim 17, wherein the first fuel cell plate is a cathode current collector plate and the second fuel cell plate is an anode current collector plate, and wherein the cathode current collector plate and the anode current collector plate are located in the same plane.

19. The system of claim 18, wherein the cathode current collector plate of the first fuel cell includes a positive electrical terminal and the anode current collector plate of the second fuel cell includes a negative electrical terminal.

20. The system of claim 19, further comprising a housing enclosing the first fuel cell stack and the second fuel cell stack such that the positive electrical terminal of the first fuel cell is disposed about a first wall of the housing and the negative electrical terminal of the second fuel cell is disposed about a second wall of the housing, the first wall being located opposite the second wall.

* * * * *